O. H. WISENANT.
MOTOR VEHICLE FENDER.
APPLICATION FILED FEB. 27, 1914. RENEWED NOV. 10, 1916.

1,210,247.

Patented Dec. 26, 1916.
2 SHEETS—SHEET 1.

Witnesses:
C. Feinle, Jr.
V. B. Hillyard.

Inventor,
Oscar H. Wisenant.
By Victor J. Evans,
Attorney.

O. H. WISENANT.
MOTOR VEHICLE FENDER.
APPLICATION FILED FEB. 27, 1914. RENEWED NOV. 10, 1916.
1,210,247.
Patented Dec. 26, 1916.
2 SHEETS—SHEET 2.
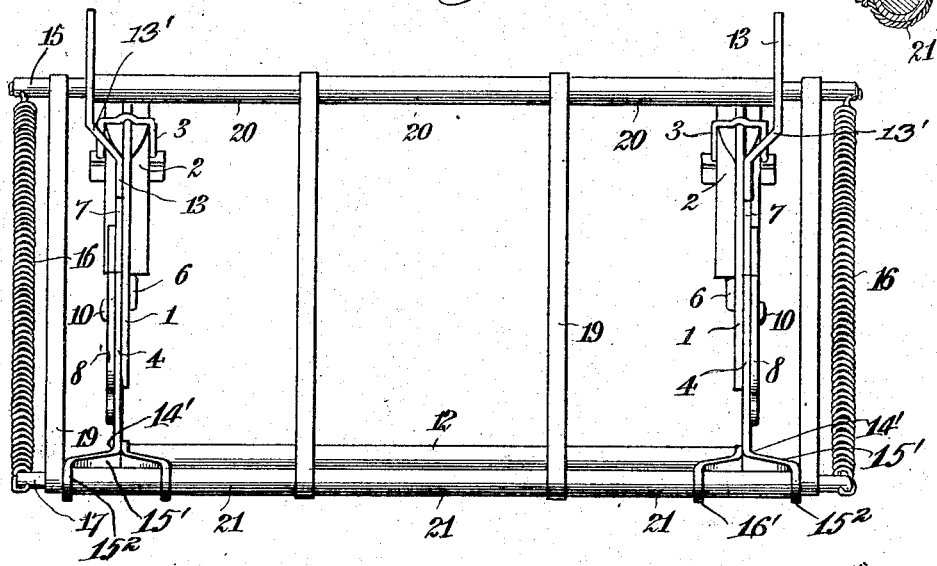
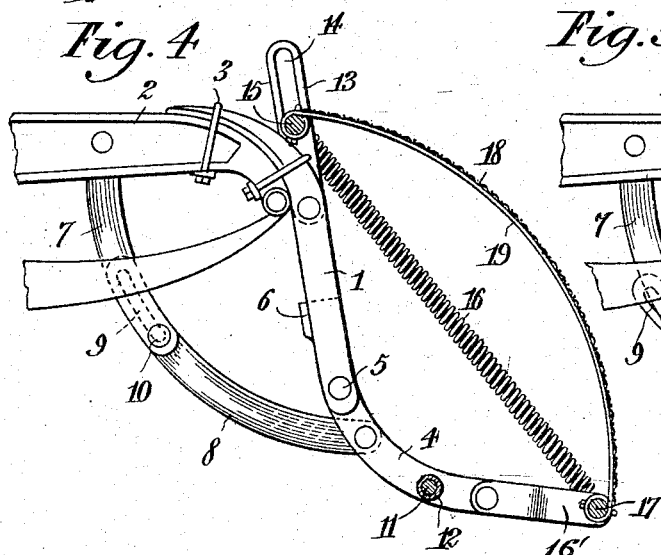
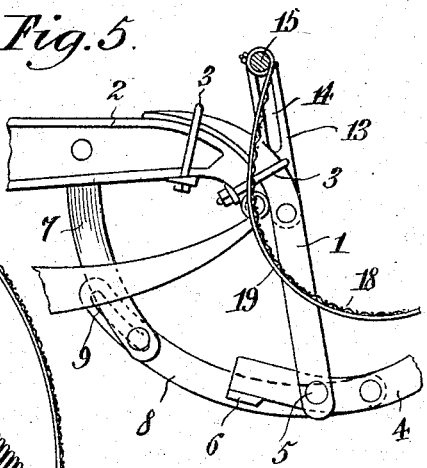
Inventor,
Oscar H. Wisenant.
By Victor J. Evans.
Attorney.
Witnesses
C. Feinle, Jr.
V. B. Hilyard.

UNITED STATES PATENT OFFICE.

OSCAR H. WISENANT, OF LA SALLE, ILLINOIS, ASSIGNOR TO WELLINGTON J. HUGHEY, OF CHICAGO, ILLINOIS.

MOTOR-VEHICLE FENDER.

1,210,247.  Specification of Letters Patent.  Patented Dec. 26, 1916.

Application filed February 27, 1914, Serial No. 821,481. Renewed November 10, 1916. Serial No. 130,653.

*To all whom it may concern:*

Be it known that I, OSCAR H. WISENANT, a citizen of the United States, residing at La Salle, in the county of La Salle and State of Illinois, have invented new and useful Improvements in Motor-Vehicle Fenders, of which the following is a specification.

The invention provides a safety appliance for vehicles generally and for automobiles in particular, said appliance being of a nature to be readily applied to the vehicle and adapted to protect life and limb, and is of such construction as to be folded so as not to be in the way when the machine is traveling in the open country or over rough roads.

The invention provides a fender embodying a novel supporting frame and a net which normally bulges outward but which, under impact with an object, bulges inward so as to receive and carry such object and prevent the same from coming in contact with any part of the machine or getting beneath the wheels thereof, the rearward bulge serving to lessen the impact and reduce and moderate the shock.

The invention consists of the novel features, details of construction and combination of parts, which hereinafter will be more particularly set forth, illustrated and claimed.

Figure 1:
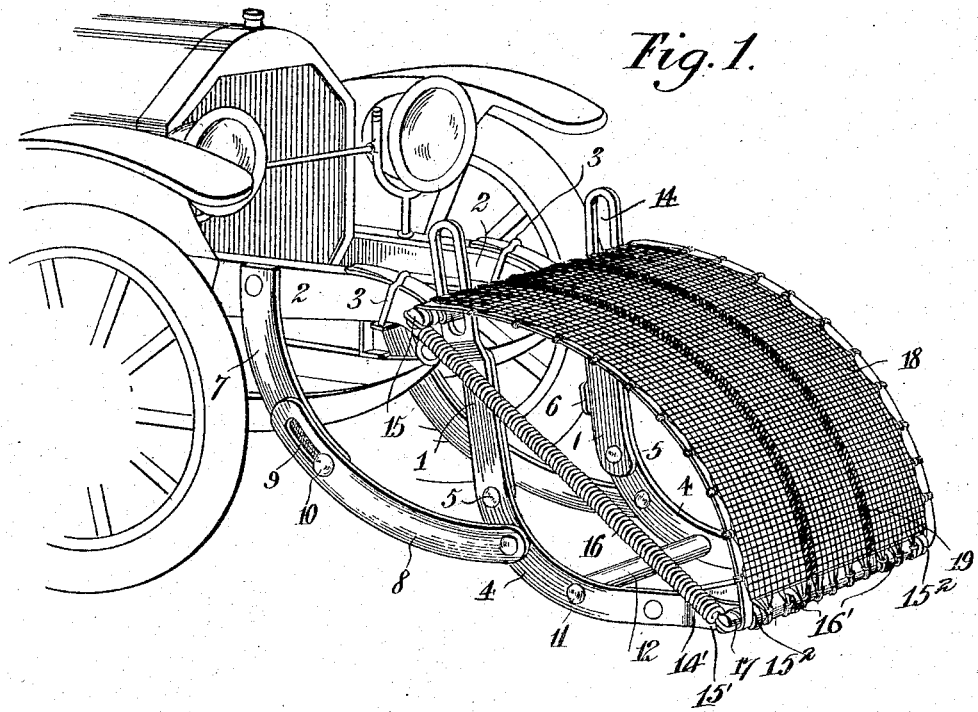
Figure 2:
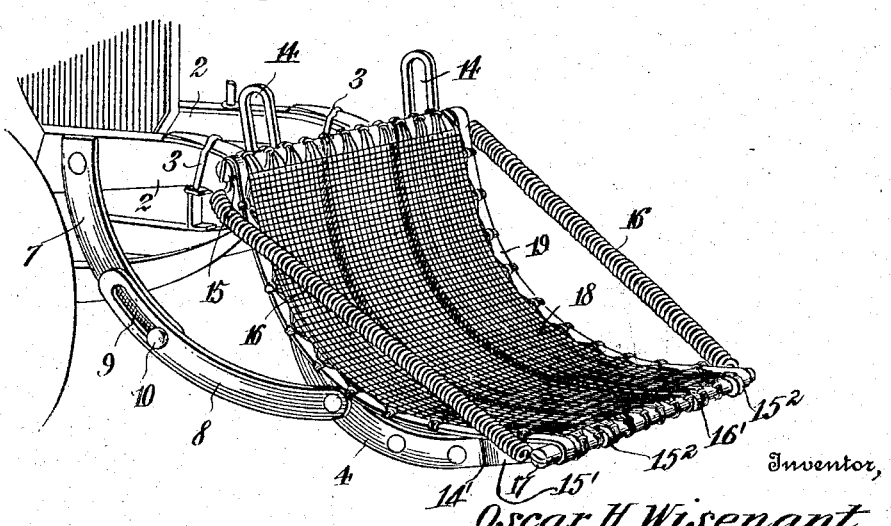

In the drawings hereto attached: Figure 1 is a perspective view of a fender embodying the invention, showing the same applied to an automobile, the net bulging outward. Fig. 2 is a perspective view of the parts illustrated in Fig. 1 showing the net bulging inward, so as to receive and carry an object after impact therewith. Fig. 3 is a front view of the supporting frame, the net being removed. Fig. 4 is a longitudinal sectional view showing the fender in position, as indicated in Fig. 1. Fig. 5 is a vertical central longitudinal section through the device and Fig. 6 is a detail view showing the front part of the fender folded so as to be out of the way.

Corresponding and like parts are referred to in the following description, and indicated in all the views of the drawings by the same reference characters.

The supporting frame embodies similar upper side bars 1, which have their upper ends rearwardly curved to conform to the curved ends of the longitudinal bars 2 of the chassis of the vehicle or machine, to which they are secured in any substantial way, preferably by means of clips 3. The front ends of the upper side bars 1 curve slightly forward and downward. Lower side bars 4 are pivotally connected near their upper rear ends with the lower ends of the upper side bars 1 as indicated at 5. The lower side bars 4 curve in their length and are arranged with their lower portions in a substantially horizontal plane whereas their rear portions curve upward and rearward. Ears 6 project laterally from the upper ends of the lower side bars 4 and constitute stops to engage the rear edges of the lower ends of the upper side bars 1 to normally hold the bars 4 in a given position. The construction is such as to admit of the bars 4 turning upon their pivot connections 5 with the bars 1 to throw their lower ends upward so as to be out of the way when the machine or vehicle equipped with a fender embodying the invention is traveling over a rough road or other open country. Braces form stays for the bars 4. Each of such braces consist of members 7 and 8, the member 7 being bolted or otherwise secured to a bar 2 and the member 8 being secured at its lower end to a bar 4. The members 7 and 8 have a slidable connection to admit of the bars 4 folding. A longitudinal slot 9 is formed in the upper end of the member 8 and receives a headed stud 10 attached to the lower end of the member 7. When the fender is in operative position the studs 10 occupy a position at the lower ends of the slots 9, thereby admitting of the braces performing service as stays. A rod 11 connects the bars 4 and receives a sleeve 12 which acts as a spacer to hold the bars 4 a proper distance apart, the projecting ends of the rod 11 being upset to prevent spreading of the bars 4. A plate 13 is fastened to the upper portion of each of the upper side bars 1 and extends upwardly and is formed with a longitudinal slot 14. The plates 13 are offset at 13' intermediate of their ends to throw the end portions in different relative planes. A rod 15 passes through the slots 14 and its end portions project beyond the outer sides of the plate 13 and have the upper ends of contractile helical springs 16 secured thereto. The front end of the bars 4 are offset as at 14' and including a laterally extending portion 15' and a forwardly extending portion 15². Securely fastened to the front end of the bar, opposite its offset portion is an angular bearing 16', said bearing being disposed in longitudinal alinement with the offset portion, whereby the bearing 16' and the forwardly extending portion 15² serves as a support or bearing for the rod 17, the latter having the lower end of the springs 16 connected thereto.

The net 18 extends between the rods 15 and 17 and is attached at its ends thereto in any substantial manner. A plurality of spring stays 19 reinforce and stiffen the net and are attached at their ends to the rods 15 and 17. The outermost spring stays 19 are secured to the edges of the net 18 so as to hold the same extended transversely. The spring stays 19 are slightly longer than the distance between the rods 15 and 17 when the rod 15 is at the lower ends of the slots 14 and as a result such stays are curved in their length and serve to bulge the net either forward or rearward as indicated in Figs. 1 and 2. The normal position of the net is indicated in Fig. 1, that is the net is bulged forward, and as a result the impact of the fender with an object is modified and the shock reduced by the force expended to bulge the net rearward, such bulging being effected against the resistance offered by the spring stays and the contractile springs 16. When the fender strikes an object, the rod 15 moves upward in the slots 14 and after the net and its stays pass a dead center the tension of the springs 16 and stays 19 moves the rod 15 downward in the slots 14. The rearward bulging of the net enables the same to carry the object and the springs 16 act in a measure to prevent the object from falling laterally from the net. The spring stays 19 are held spaced apart by means of sleeves 20 and 21 slipped upon the respective rods 15 and 17.

From the foregoing description, taken in connection with the accompanying drawing, the advantages of the construction and of the method of operation will be readily apparent to those skilled in the art to which the invention appertains, and while I have described the principle of operation of the invention, together with the device which I now consider to be the best embodiment thereof, I desire to have it understood that the device shown is merely illustrative, and that such changes may be made when desired as are within the scope of the invention as claimed.

Having thus described the invention what is claimed as new, is:—

1. In a fender for a vehicle, a supporting framework for a net, such framework comprising upper and lower side bars, the latter having their rear portions curving upward and their lower portions normally extending horizontally and such lower side bars having pivotal connection near their upper ends with the lower ends of the upper side bars to admit of the lower side bars folding upward, stops projecting from one set of bars to engage the other to hold the lower side bars in a given position, a rod supported in the forward ends of the lower bars, a second rod supported by the upper side bars and having a limited movement, a net secured at its ends to the said rods and normally bulging forward, and spring means connecting the said rods and normally exerting force thereon to hold the net forwardly bulged.

2. In a fender for a vehicle, the combination of upper side bars, lower side bars pivotally connected to the upper side bars, stops projecting laterally from the lower side bars to engage the upper side bars and normally hold the lower side bars in a given position, brace members pivotally connected to the lower side bars and having longitudinal slots, other brace members secured to the frame work of the vehicle, headed studs attached to the last mentioned brace members and entering the longitudinal slots of the first mentioned brace members, and a net secured to the before mentioned upper and lower side bars.

3. In a fender for a vehicle, the combination of upper and lower side bars pivotally connected, plates secured to the upper side bars and having longitudinal slots in their upper ends and having offsets intermediate of their ends to throw the end portions of the plates in different vertical planes, an upper transverse rod supported in the longitudinal slots of the plates, a lower transverse rod supported in the lower side bars of the frame, a spring-supported net attached at its ends to the upper and lower transverse rods and normally bulged forward and adapted to be reversely bulged, and contractile helical springs connecting the ends of the said upper and lower transverse rods.

In testimony whereof I affix my signature in presence of two witnesses.

OSCAR H. WISENANT.

Witnesses:
L. A. BROWN,
JOE BREGANT.

Copies of this patent may be obtained for five cents each, by addressing the "Commissioner of Patents. Washington, D. C."